(12) United States Patent
DeAngeles

(10) Patent No.: US 7,834,473 B2
(45) Date of Patent: Nov. 16, 2010

(54) MOMENTUM-CONSERVING WIND-DRIVEN ELECTRICAL GENERATOR

(76) Inventor: Steven J. DeAngeles, 6657 N. Lightfoot Ave., Chicago, IL (US) 60646

( * ) Notice: Subject to any disclaimer, the term of this patent is extended or adjusted under 35 U.S.C. 154(b) by 0 days.

(21) Appl. No.: 12/623,670

(22) Filed: Nov. 23, 2009

(65) Prior Publication Data

US 2010/0060003 A1 Mar. 11, 2010

Related U.S. Application Data

(63) Continuation of application No. 12/019,893, filed on Jan. 25, 2008, now Pat. No. 7,635,923.

(51) Int. Cl.
*F03D 9/00* (2006.01)
(52) U.S. Cl. .......................... 290/44; 290/43
(58) Field of Classification Search .................. 290/43, 290/44
See application file for complete search history.

(56) References Cited

U.S. PATENT DOCUMENTS

| | | | |
|---|---|---|---|
| 4,193,005 A | | 3/1980 | Kos et al. |
| 4,446,376 A | * | 5/1984 | Baker .......................... 290/44 |
| 4,464,579 A | | 8/1984 | Schwarz |
| 5,332,925 A | | 7/1994 | Thomas |
| 6,465,902 B1 | * | 10/2002 | Beauchamp et al. .......... 290/55 |
| 7,040,858 B2 | * | 5/2006 | Suzuki ........................ 415/4.2 |
| 7,215,037 B2 | * | 5/2007 | Scalzi ......................... 290/55 |
| 2006/0125241 A1 | | 6/2006 | DuHamel |
| 2008/0191483 A1 | | 8/2008 | Takeuchi |
| 2009/0187282 A1 | | 7/2009 | Menke et al. |

FOREIGN PATENT DOCUMENTS

| | | |
|---|---|---|
| FR | 2355179 A | 6/1976 |
| GB | 2187512 | 11/1985 |
| JP | 60081473 A | 5/1985 |
| JP | 401142274 A | 6/1989 |
| JP | 08322297 A | 12/1996 |
| JP | 10159706 | 6/1998 |
| JP | 2000145613 A | 11/1998 |
| JP | 200777895 | 3/2007 |
| ZA | 200204233 A | 5/2002 |

OTHER PUBLICATIONS

Notice of Allowance dated Nov. 4, 2009, U.S. Appl. No. 12/019,893 Filing Date Jan. 25, 2008, First named inventor: DeAngeles.
Non-Final Office Action dated Jul. 14, 2009, U.S. Appl. No. 12/019,893 Filing Date: Jan. 25, 2008, First named inventor: DeAngeles.

* cited by examiner

*Primary Examiner*—T C Patel
*Assistant Examiner*—Iraj A Mohandesi
(74) *Attorney, Agent, or Firm*—Joseph P. Krause; Kelly & Krause, LP

(57) ABSTRACT

Wind-driven electrical generators will slow and lose kinetic energy when the wind slows or stops. When the wind slows or stops, kinetic energy in the rotating turbine and other rotating components that would otherwise be lost, is conserved by supplying a supplemental mechanical energy to the rotating components using a battery-powered motor. The electrical power for the drive motor is obtained from solar-charged batteries. In an alternate embodiment, solar cells provide all of the energy for the drive motor.

3 Claims, 6 Drawing Sheets

MOMENTUM-CONSERVING WIND-DRIVEN ELECTRICAL GENERATOR

RELATED APPLICATIONS

This application is a continuation application of U.S. patent application Ser. No. 12/019,893, filed Jan. 25, 2008. This application therefore claims the benefit of the filing date of U.S. patent application Ser. No. 12/019,893.

BACKGROUND OF THE INVENTION

FIG. 1 is a simplified depiction of a wind-driven generator 2. Wind, represented by reference numeral 3, causes a propeller 4 to rotate. The propeller 4 drives a generator 5, which generates electricity. The electricity generated by the generator 5 flows through a transmission line 6 to a load, such as an electrical power grid represented by reference numeral 7 or a consumer's home, a business or a small factory.

A problem with wind-driven electric power generation is that wind is unreliable and its speed is never constant. Excess propeller speed caused by high winds can be limited by a brake or by blade pitch, however, propeller speed cannot be downwardly controlled when wind velocity falls. When the wind speed falls, electric output power will fall since electric output power is directly related to propeller rotation speed. When the wind stops, output power will also stop. Fluctuating wind speed will therefore cause generator output to fluctuate.

A closely related problem is that the propeller 4 requires a certain amount of kinetic energy, i.e., rotational velocity, before it can even begin to generate usable amounts of output power, as FIG. 2 shows. Some energy must be imparted to the propeller before it can generate usable electric output power. When the wind slows or stops, latent kinetic energy in the rotating propeller and other rotation machinery connected to the propeller begins to dissipate through wind loss, bearing loss and electrical loading, if the generator is not disconnected from its electrical load. The lost kinetic energy must be restored by the wind before the generator can resume generating power. Maintaining propeller speed when the wind slows or stops might improve wind generator efficiency by shortening the time required to bring the generator on-line after the wind speed has recovered. A method and apparatus for simply and economically maintaining propeller speed, during intervals when the wind slows or has stopped, would be an advantage over the prior art.

DETAILED DESCRIPTION

Figure 1:
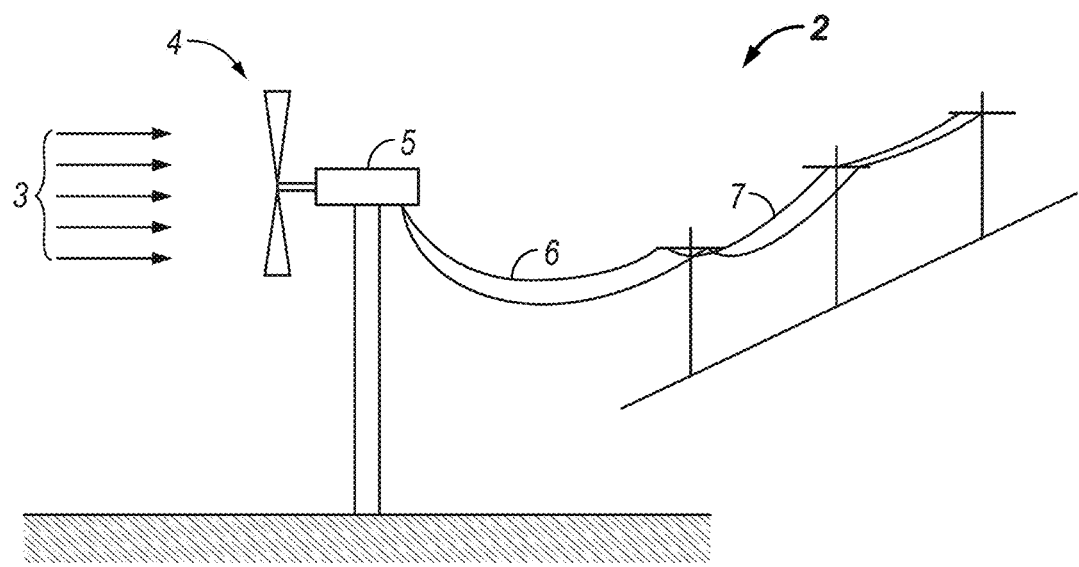
FIG. 1 is a simplified depiction of a wind-driven generator 2.
Figure 2:
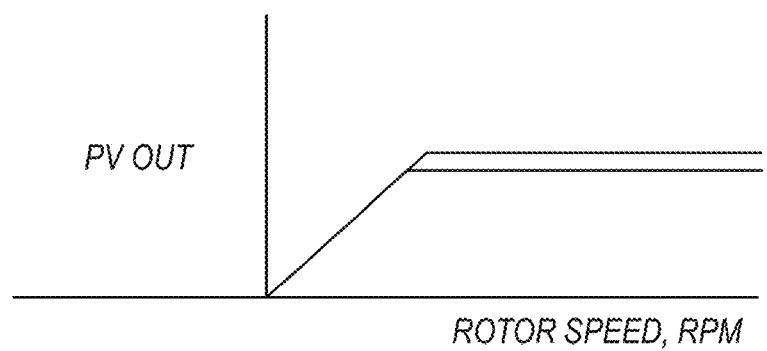
FIG. 2 is a graph of wind generator output power as a function of wind speed.
Figure 3:
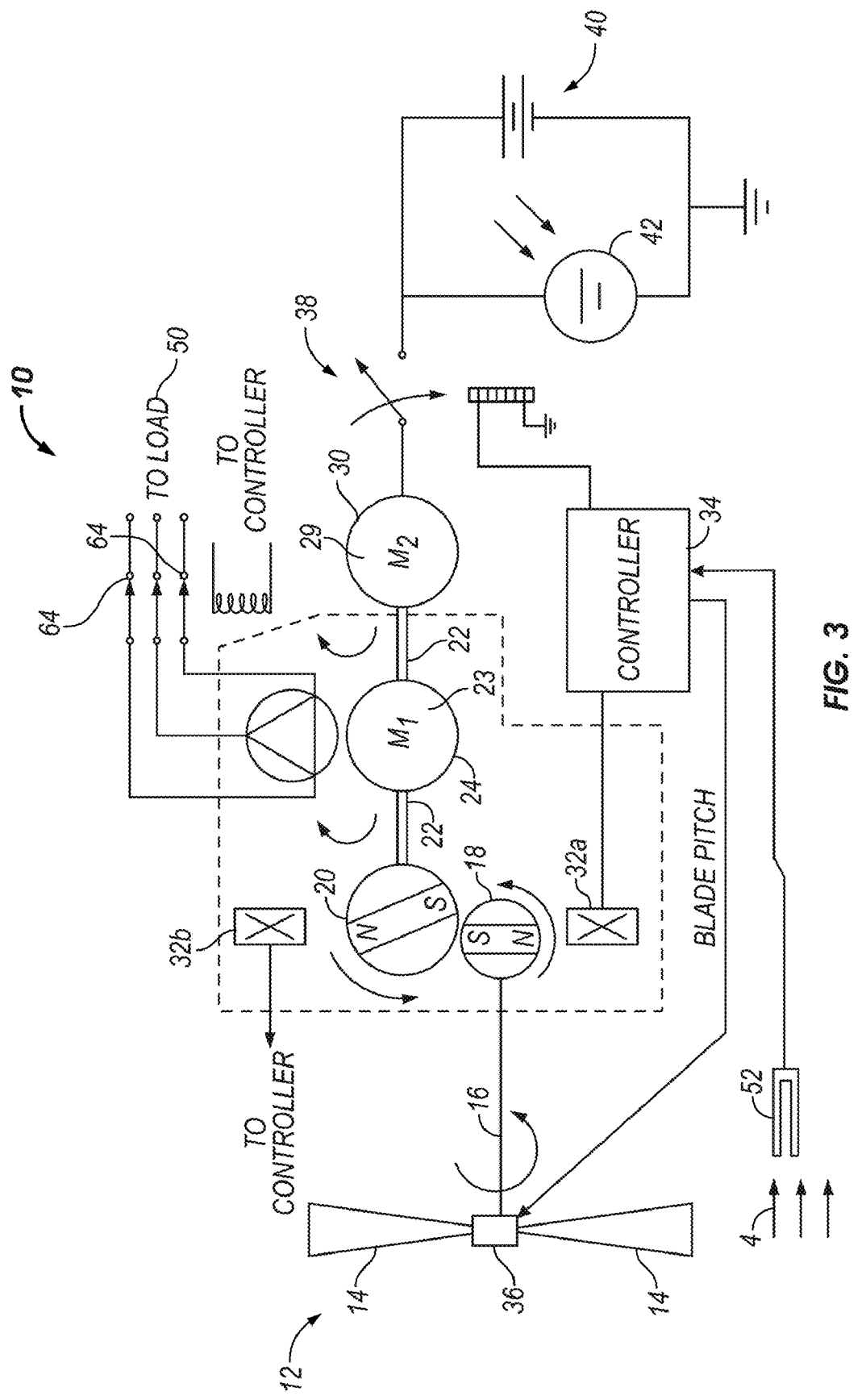
FIG. 3 is a schematic diagram of a momentum-conserving wind-driven, momentum-conserving electricity generator.

FIG. 3 is a schematic diagram of a momentum-conserving wind-driven electricity generator 10. The generator 10 is comprised of a wind-driven, rotating propeller 12 that is mounted to a first elongated drive shaft 16. The propeller 12 is comprised of two or more propeller blades 14 that are affixed to a central hub 36 that houses a bi-directional servo motor (not shown) for each blade. Each servo motor is coupled to the controller 34 and rotates the blade 14 around its longitudinal axes (extending outwardly, radial to the hub but not shown for clarity) in order to control the blade's pitch under software control. The ability to controllably rotate the propeller blades around their longitudinal axes provides an ability to control blade speed in response to wind speed fluctuations.

When the wind velocity is too low to generate usable power and/or when the wind has stopped, propeller momentum and the momentum or other rotating machinery connected to the propeller is conserved, at least temporarily, using electric energy stored in rechargeable batteries to drive a motor that keeps the propeller turning. The rechargeable batteries are kept charged using energy from photovoltaic cells or from the generator 10 itself during periods when wind velocity permits the generator 12 to produce excess power. In an alternate embodiment, the back-up drive motor is powered directly and exclusively by energy provided by arrays of photovoltaic cells, i.e., solar cells.

Still referring to FIG. 3, wind 4 that strike the blades 14 of the propeller 12 will undergo a change in momentum and impart a force against the propeller blade 14 that causes the propeller 12 to rotate about its axis, which is the geometric center of the first drive shaft 16. Stated another way, when the wind 4 blows, it will cause the propeller 12 to rotate the first drive shaft 16, to which the propeller 12 is attached.

The first drive shaft 16 is mechanically coupled to a first drive gear 18, which includes a magnet, which in combination with a Hall-effect sensor, is used to measure first drive gear 18 rotation speed. The first drive gear 18 is engaged to a much smaller-diameter second driven gear 20 so that the relatively slow propeller 12 speed produces a higher driven gear 20 rotation speed.

Driven gear 20, which can also include one or more magnets, is attached to a second elongated drive shaft 22. The mechanically rotating armature 23, i.e., the rotating electric field winding 23 of a generator 24, is coupled to the second drive shaft 22 such that when the wind blows, it causes the propeller 12 to rotate. Propeller rotation causes the first drive shaft 16 and the first drive gear 18 to both rotate. Rotation of the first drive gear causes the second driven gear 20 and the second drive shaft 22 to rotate, which causes the generator field winding 23 to rotate, albeit in a direction, opposite the propeller, first drive shaft 16 and first drive gear 18. Since the elongated drive shaft 22 is directly connected to rotating field winding 23 of the generator 24, propeller rotation causes the generator 24 to generate electrical energy in the electrical armature 26 of the generator 24.

Those of ordinary skill in the art are familiar with the use of so-called Hall-effect sensors to detect the position of a rotating shaft but also to measure shaft rotation speed. In the embodiments disclosed herein, a shaft rotation speed detector 32A, preferably embodied as a Hall effect sensor, is mounted at an effective distance away from magnets in the first gear 18. The magnets and their rotation enable the detector 32A, in combination with the controller 34 to which the detector 32A is coupled, to detect variations in the shaft rotational speed. Since the detector 32A, in combination with the controller 34, is able to detect and measure shaft speed, detector 32 is therefore able to indirectly detect wind speed as well as indirectly detect electrical loading on the generator 10 because wind speed and loading will both affect shaft rotation speed.

Those of ordinary skill in the art know that the rotational speed of the propeller 12 rarely goes over a few dozen turns per minute. The generator 24, however, requires a relatively high rotation speed. The driven gear 20 is therefore usually much smaller than the drive gear 18 in order to obtain an acceptable rotation speed from a relatively slow-turning propeller 12. The faster rotational speed of the driven gear 20 enables a Hall-effect sensor 32B located proximate to magnets in the driven gear 20 to detect relatively small changes in the rotational speed of the gear 20, shaft 22 and generator 24. It will therefore usually be advantageous to detect propeller 12 speed fluctuations using a second Hall-effect sensor 32B proximate to the driven gear 20, since a small change in propeller rotation speed will cause a larger change in driven gear 20 rotation speed.

As set forth above, generator 24 rotation speed will be determined by both the wind speed and the electrical load 50 on the generator 24. Stated another way, shaft speeds will decrease as electrical loading is increased. In an alternate embodiment, wind speed is measured by one or more other kinds of wind speed detectors, such as one or more pitot tubes 52. Shaft speed decreases, i.e., deceleration, attributable to wind speed can be more accurately attributed to wind speed decreases by measuring wind speed using a device such as a pitot tube in combination with a shaft speed detector since a pitot tube will not be able to detect minute wind speed changes that might nevertheless affect shaft speed that is detectable by the sensors 32A and/or 32B.

In the embodiment shown in FIG. 3, the elongated shaft 22 extends all the way through the generator 24 and is directly coupled to the rotating armature of a D.C. drive motor 30. Stated another way, the field of the generator 24 and the armature of the drive motor 30 are both mechanically coupled to the same elongated shaft 22 such that they rotate together. Since the armature of the drive motor 30 rotates with the elongated shaft 22, the mechanical coupling of the elongated shaft 22 to the armature of the motor 30 effectively couples the drive motor 30 to one or both of the detectors 32A and 32B. The detector 32A (and/or 32B) can therefore be used to indirectly measure the speed of the drive motor 30 whenever the drive motor 30 is "powered up" to provide rotational torque to the elongated shaft 22.

Figure 4:
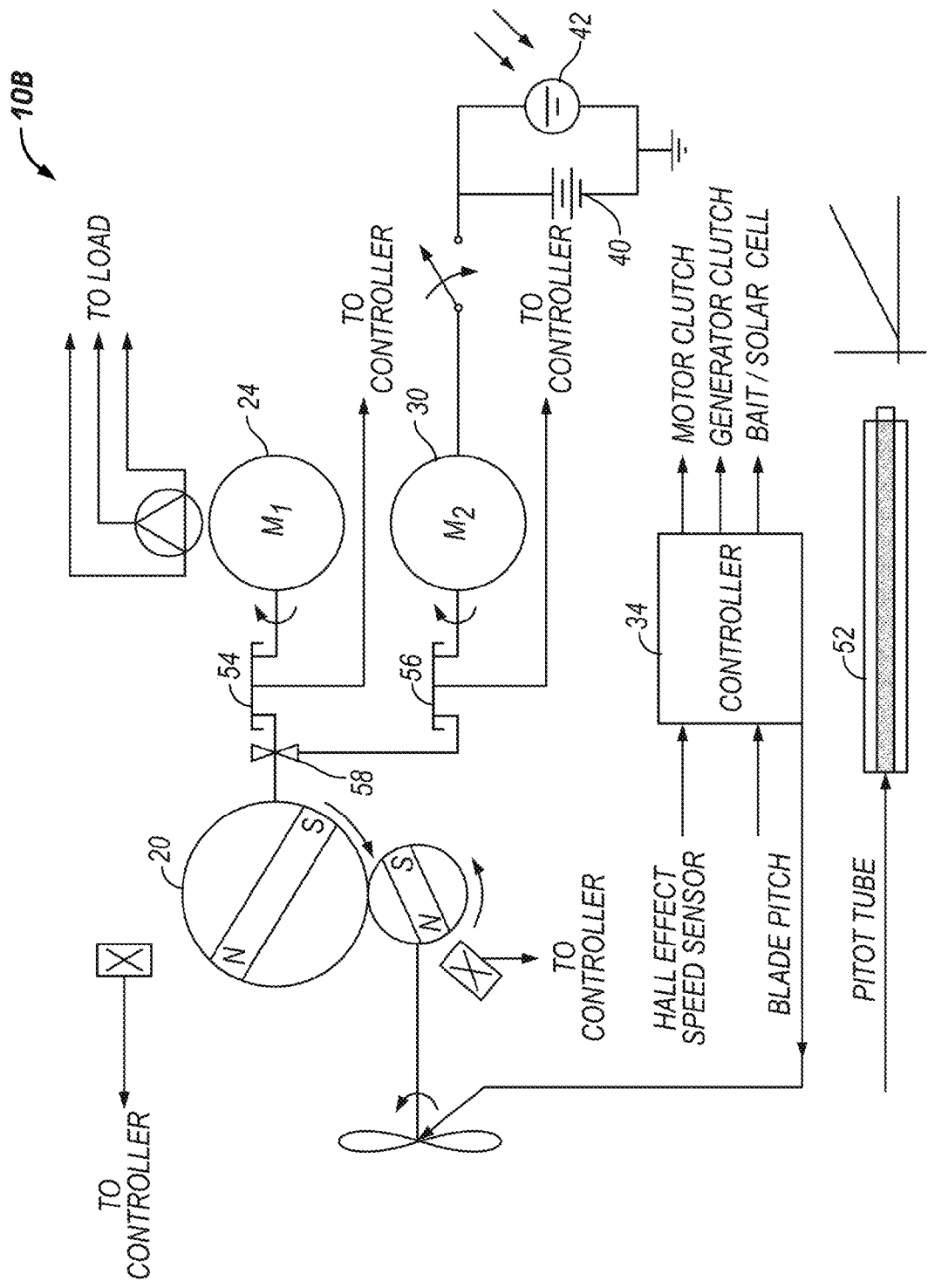
FIG. 4 is a schematic diagram of an alternate embodiment of a momentum-conserving wind-driven, momentum-conserving electricity generator.
Figure 5:
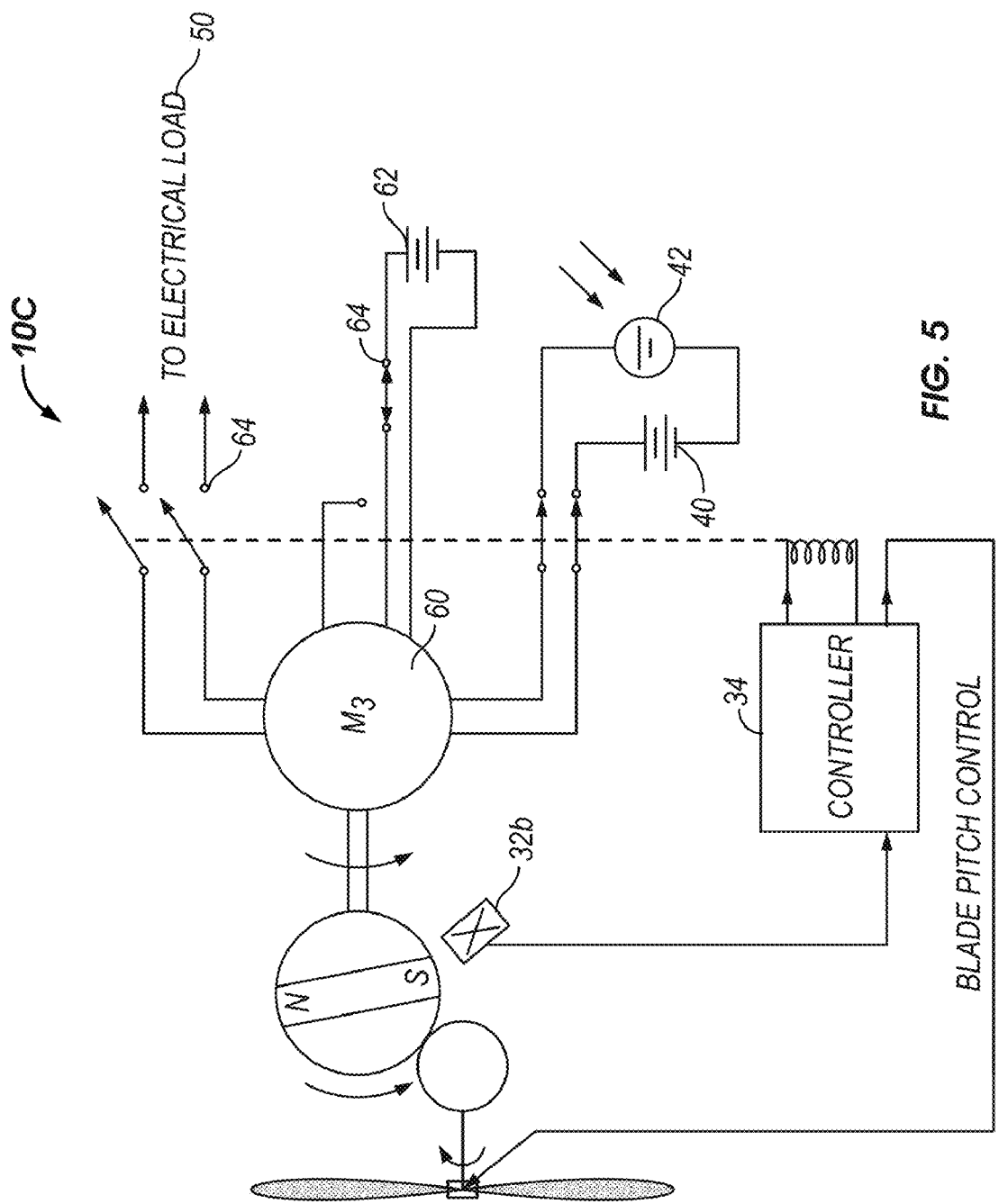
FIG. 5 is a schematic diagram of yet another embodiment of a momentum-conserving wind-driven, momentum-conserving electricity generator.

As was stated above, when wind 4 speed drops, the rotating machinery in the generator 10 will also drop. When the wind stops, the rotating machinery in the generator will also stop. When the wind speed drops or when the wind stops, kinetic energy in the rotating machinery, i.e., angular momentum, can be maintained or conserved, by adding rotational torque from an external source, which in each of FIG. 3, FIG. 4 and FIG. 5, is the D.C. powered drive motor 30. As shown in the figures and as described above, drive motor 30 is mechanically connected to the rotating machinery and powered up, under software control, whenever wind speed falls or when the wind stops such that usable output power cannot be generated by the wind.

Clean and renewable electrical power is supplied to the drive motor 30 from either a rechargeable battery pack 40 or a photovoltaic array, i.e., solar cells 42 or both the battery 40 and the solar cells 42 together. When electrical power is applied to the drive motor 30 from the battery 40 and/or the solar cells 42, the drive motor 30 can at least temporarily overcome losses in the rotating machinery in order to keep the rotating machinery rotating at either full speed or at a reduced speed until the wind speed adequately picks up. Clean and renewable electrical energy stored in the battery 40 can therefore be used to conserve the angular momentum acquired by rotating machinery of the generator when wind speed is too low to drive an electrical load or when the wind has stopped. Maintaining the rotation of speed of at least the propeller, i.e., conserving its momentum, avoids having to wait until an otherwise stopped propeller is brought back up to speed by the wind and thus makes wind-generated power available sooner, i.e., without having to wait for the wind to adequately spin-up the propeller 12.

Electrical energy from the battery pack 40 and the solar cells 42 is provided to the drive motor 30 through a software-controlled switch 38, which is activated by and under the control of a controller 34, such as a microprocessor or microcontroller. The controller 34 "closes" the switch 38 by sending an appropriate signal to the coil 39 for the switch 38, which causes the contacts of the switch to close and complete an electrical circuit between the drive motor 30 and the rechargeable battery 40 and solar cells 42. When the switch 38 closes, the battery 40 and the solar cells 42 are connected to the motor 30. When the wind speed picks up and becomes sufficient to generate electrical power, the switch 38 is opened by the controller 34, which disconnects the motor 30 from the battery 40 and the solar cells 42. Energy required to at least temporarily maintain propeller 12 rotation during wind outages is therefore supplied by solar energy captured by the solar cells 42. The battery is also kept charged by the solar cells when they're not needed to power the drive motor 30.

Figure 6:
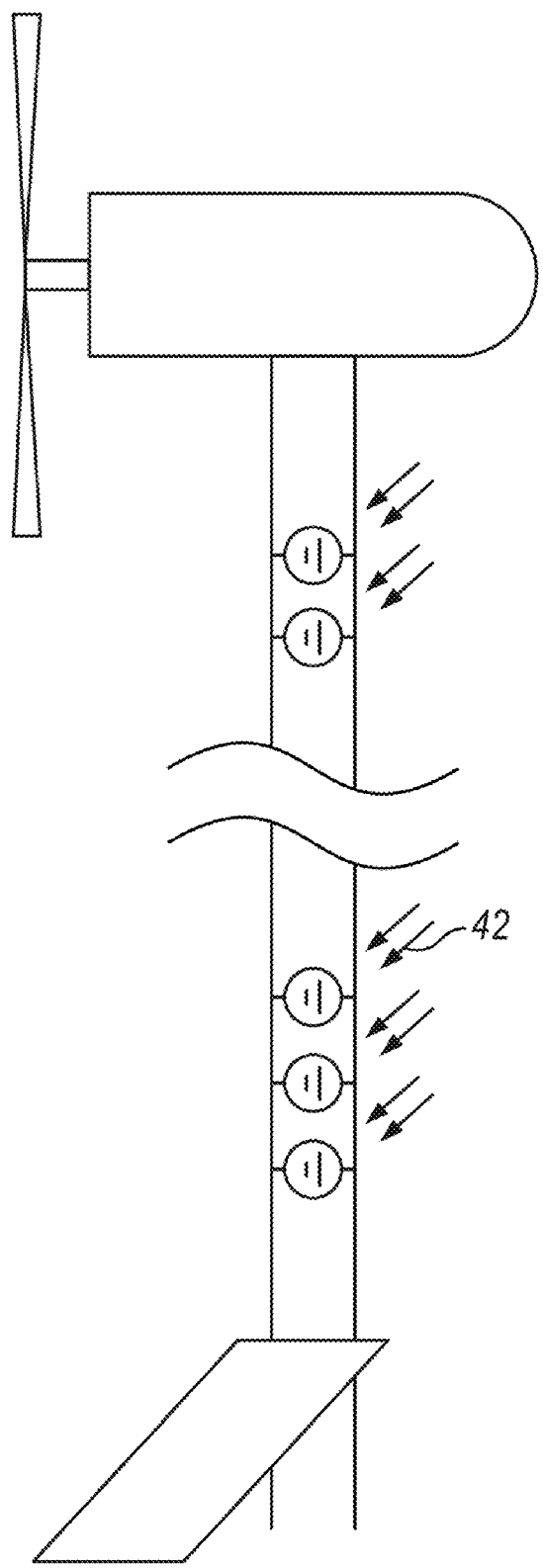
FIG. 6 depicts a wind driven generator having solar cells on the tower supporting the wind driven generator.

In one embodiment, the solar cells 42 are attached to the pole (See FIG. 6) or a tower that the generator 10 is mounted on. In yet another embodiment, solar cells are applied to surfaces of the propeller. Since it may be possible to mount numerous cells on a pole and/or tower, an alternate embodiment of the generators disclosed herein include a drive motor 30 that is powered exclusively by energy obtained from solar cells 42, as well as in addition to power obtained from a battery pack 40.

The controller 34 that controls operation of the generator 10 is preferably a microcontroller or microprocessor, both of which are well known to those of ordinary skill. Such devices execute program instructions that are stored in addressable memory devices, not shown for clarity and simplicity but well known to those of ordinary skill.

In the generator 10 shown in FIG. 3, program instructions executed by the controller 34 cause the controller 34 to monitor the output of one or more pitot tubes 52 as well as the Hall-effect sensor(s) 32A and/or 32B. When the pitot tubes 52 and/or Hall-effect sensors 32A and/or 32B indicate that the propeller speed is decreasing due to wind speed, the controller 34 executes instructions to keep the rotating machinery turning.

When a wind speed loss is detected, the controller 34 first disconnects the generator 10 from any electrical load 50 that it might be driving. Disconnecting the electrical load 50 is readily accomplished using a software controllable transfer switch or relay 64, well known to those of ordinary skill, the actuation of which disconnects the generator 24 output from any load that it was previously driving.

Simultaneously with or shortly after load disconnection, the controller 34 changes the pitch of the blades 14 of the propeller 12 in order to minimize wind drag. Reducing wind drag by "feathering" the propeller blades allows the propeller and other rotating machinery connected to the propeller to continue to rotate longer than they would if the propeller blades were "facing" into the air through which the propeller rotates.

Figures 7A, 7B:
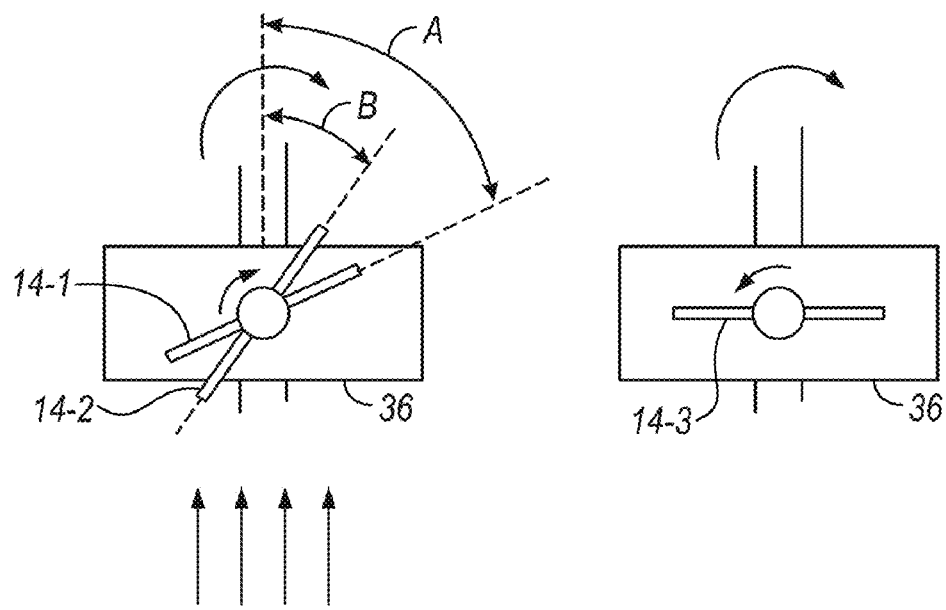
FIGS. 7A and 7B depict different positions of a propeller blade rotated about its lengthwise axis.
Figure 8:
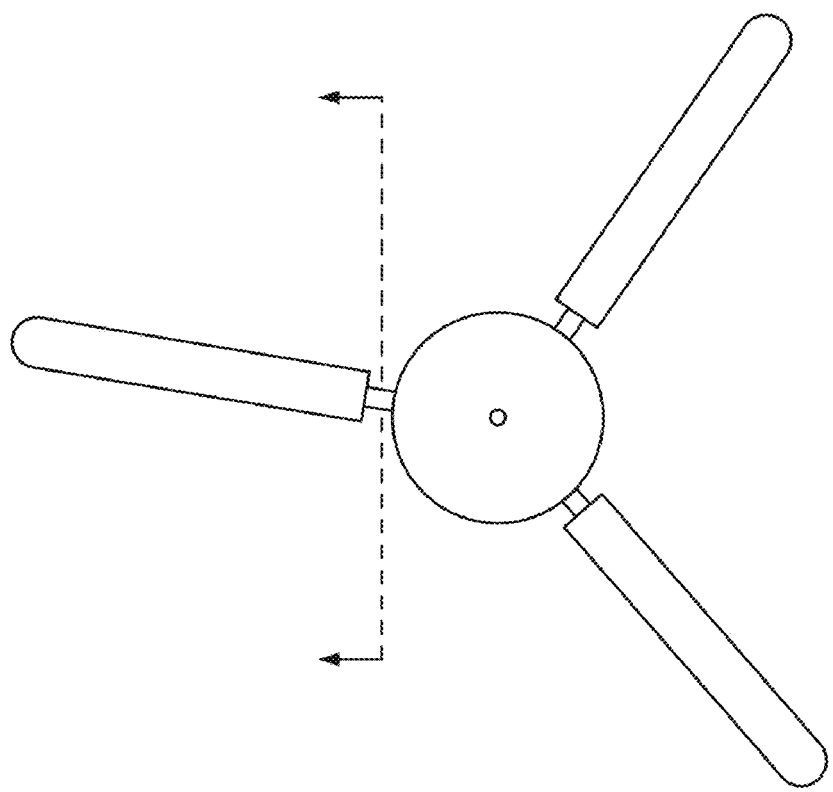
FIG. 8 depicts where the views shown in FIGS. 7A and 7B are taken.

In the embodiments disclosed herein, the blades 14 of the propellers 12 extend radially from a central hub 36. FIGS. 7A and 7B are top views of the propeller 12 blade 14 and illustrate how the blade 14 can be rotated to have different angular orientations or pitch. At least three different pitches are shown and which are identified as 14-1, 14-2 and 14-3. The broken line in FIG. 8 shows the direction from which the views in FIGS. 7A and 7B are taken.

In a first position denoted as 14-1, the planar face of the blade 14 of the propeller 12 forms a first angle denoted as "α" relative to the axis of the shaft 16 and which is approximately 75 degrees. In a second position 14-2, the blade 14 forms a second angle "β" that is approximately 45 degrees. In a third position 14-3, the blade 14 is "flat." When the propeller blade 14 is flat as shown in the third position 14-3, wind directed at the propeller 12 will not cause the propeller 12 to rotate but wind resistance created by the blades 14 when they are rotated by the motor 30, will be minimized. In other words, by "feathering" the blades 14 to the third position 14-3, the power that must be provided by the drive motor 30 to keep the propeller 12 rotating will be significantly reduced as compared to the power that would be required when the blades are at the first position 14-1 or second position 14-2.

When the controller 34 detects that the shaft 16 and/or 18 is slowing due to wind speed loss, the controller 34 sends signals to servo motors within the hub 36, to cause the blades to rotate to the third position 14-3 (shown in FIG. 7B) so that the wind resistance created by the rotation of the blades 14, and which must be overcome by the drive motor 30, can be minimized. By rotating the blades 14 to minimize wind resistance, the power required from the drive motor 30 to maintain the speed of the propeller 12 and other rotating machinery connected to the propeller is minimized.

Simultaneously with or shortly after rotating the propeller blades to minimize wind drag, the controller 34 "closes" switch 38 to connect a power source, either the battery pack 40, the solar cells 42 or both, to the drive motor 30. Closing switch 38 therefore activates the drive motor 30, which will apply rotational torque to the rotating machinery for as long as the rechargeable battery pack 40 and the solar cells 42 are able to keep the motor turning the rotating components of the generator, i.e., the generator 24, the drive shafts 22 and 16 and the propeller 12. When the wind driving the propeller 12 dies down or stops, the momentum of the rotating propeller and of other rotating components, can be conserved for as long as the battery 40 and/or the solar cells 42 are able, by having the drive motor 30 supply mechanical energy to the rotating propeller. Maintaining the propeller's rotation from the battery pack 40 and solar cells 42 will minimize the energy that must be restored to the propeller by the wind, before the generator 10 can start generating power again and hence reduce the time that the generator is unavailable.

FIG. 4 depicts another generator embodiment 10B. In FIG. 4, the generator 24 and the drive motor 30 are separately and independently connectable to the driven gear 20 through a combination of separately-operable electrically-controlled clutches 54 and 56 and differential gears 58. The differential gears 58 and clutches enable the driven gear 20 to be mechanically connected to either the generator 24 or the drive motor 30. The embodiment of FIG. 4 differs from the embodiment of FIG. 3 by the mechanical disconnection of the generator 24 from the shaft 22 and therefore the shaft 16 and propeller 12 and other rotating machinery. Since the battery 40 and/or solar cells 42 are not required to supply power to the motor 30 that would be needed to keep the generator 24 rotating, a battery 40 and solar cells 42 used in the embodiment depicted in FIG. 4 are able to keep the propeller 12 and drive shafts 16 and 22 rotating longer than they would the embodiment shown in FIG. 3.

As with the embodiment shown in FIG. 3, in FIG. 4, the controller 34 read signals from wind speed sensors, such as one or more pitot tubes 52 and/or one or more shaft speed sensors 32A and 32B. When the controller 34 detects that the wind is falling or that the wind has stopped, the controller 34 is programmed to send a signal to the generator clutch 54 to mechanically disconnect the generator 24 from the rotating drive train, i.e., driven gear 20 and shaft 22. Simultaneously or shortly thereafter, the controller sends a different signal to the motor clutch 56, which mechanically connects the drive motor 30 to the driven gear 20, through the differential gears 58.

After the generator 24 has been mechanically disconnected from the drive gear 20 and after the drive motor 30 has been connected in its place, the controller sends a third signal to a solenoid 38, which in FIG. 4 is configured to connect the drive motor 30 to the rechargeable battery pack 40 and the solar cells 42 in order to energize the drive motor 30.

As with the embodiment depicted in FIG. 3, the rechargeable battery pack 40 is kept in a charged state using current supplied to it by one or more photovoltaic solar cells 42. As with the embodiment depicted in FIG. 3, power for the drive motor 30 can also be provided to it by the solar cells 42, either in parallel with the battery pack 40 or exclusively, at the same time that the battery pack 40 provides power to the motor 30.

The generator clutch 54 and the drive motor clutch 56 are electrically-actuated clutches that can be separately and independently controlled by separate and corresponding solenoids, which are not shown for clarity. In an alternate embodiment, a single double-pole, double-throw solenoid could be used to control both clutches by a single signal from the controller 34. The generator clutch 54 and/or the drive motor clutch 56 can also be either pneumatic or hydraulic, with the application of the working fluid, i.e., compressed air or hydraulic fluid, determined by the actuation of appropriate, software-controlled valves, which are also not shown for clarity.

Referring now to FIG. 5 there is shown yet another embodiment 10C, of a momentum-conserving wind-driven electricity generator 10. In FIG. 5, a D.C. motor/D.C. generator 60 is used in place of a separate motor and separate generator.

In a first mode of operation, the motor/generator 60 armature (not shown) is configured to operate as a D.C. generator. An external D.C. source generates a magnetic field in that rotates within field windings that are coupled to an electrical load. Rotation of the "armature" by the shaft 22 causes the motor/generator 60 to generate, i.e., output electric power to an electrical load.

In a second mode of operation, the electrical connections the motor/generator 44 are reversed from what they are in the first mode. In the second mode, the motor/generator operates as a D.C. motor. In the second mode, the motor/generator 44 is electrically disconnected from the electrical load using a transfer switch, the actuation of which connects the stationary "field" windings to the rechargeable battery pack 40 and/or the solar cells 42. As with the first and second embodiments, the D.C. motor in the third embodiment can be powered by the battery or the solar cells or both the battery and the solar cells in parallel.

In FIG. 5, electrically re-configuring the motor/generator 60 to function as either a generator or a drive motor eliminates the need for clutches and gears required by the embodiment shown in FIG. 4. The embodiment of FIG. 5 also obviates the need to keep two machines rotating as required by the embodiment shown in FIG. 3. By simply re-configuring the motor/generator 60 based on wind conditions, the momentum of the rotating propeller 12 can be conserved so that the when wind conditions permit electricity generation to resume, all that needs to be done is to switch the transfer switch 52 from one position to another.

Those of ordinary skill in the art will appreciate and recognize that the true scope of the invention is defined by the appurtenant claims and not by the foregoing description.

What is claimed is:

1. In a wind-driven electrical generator comprised of a propeller coupled to a drive shaft, the propeller being comprised of a plurality of blades affixed to a central hub that rotates with the drive shaft and which houses at least one servo motor, the at least one servo motor being coupled to a controller and configured to rotate at least one propeller blade around an axis of the propeller blade that extends outwardly from the central hub, the at least one servo motor controlling the blade's pitch, a method of controlling the propeller comprising the steps of:

detecting a drive shaft deceleration;

sending a first signal to the at least one servo motor, responsive to a detected drive shaft deceleration, the first signal causing the at least one servo motor to change the pitch of at least one of the plurality of propeller blades to reduce wind drag on the propeller;

sending a second signal to at least one switch, responsive to a detected drive shaft deceleration, the second signal causing the switch to reconfigure the generator to act as a motor, the motor functioning to maintain propeller rotation.

2. The method of claim 1, further including the step of electrically de-coupling the generator from an electrical load, prior to the step of sending a first signal.

3. The method of claim 1, wherein the drive shaft of the wind-driven electrical generator is mechanically coupled to an electricity generator wherein, said electricity generator is capable of being reconfigured to operate as a motor to rotate the propeller.

* * * * *